United States Patent
Sasso et al.

(10) Patent No.: US 8,593,943 B2
(45) Date of Patent: Nov. 26, 2013

(54) N_PORT ID VIRTUALIZATION NODE REDUNDANCY

(75) Inventors: Christian Sasso, Milpitas, CA (US); Hariharan Balasubramanian, Oak Park, CA (US); Vithal Shirodkar, Fremont, CA (US); Ronak Desai, Fremont, CA (US); Ankur Goyal, San Jose, CA (US); Santosh Rajagopalan, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 12/661,679

(22) Filed: Mar. 22, 2010

(65) Prior Publication Data

US 2011/0228670 A1     Sep. 22, 2011

(51) Int. Cl.
*G01R 31/08*     (2006.01)
*H04L 12/28*     (2006.01)

(52) U.S. Cl.
USPC ........... 370/221; 370/401; 370/465; 370/299; 370/229; 370/230; 370/235; 370/259; 370/216; 709/226; 709/220; 711/108; 711/154; 714/100; 714/3; 714/1; 714/6

(58) Field of Classification Search
USPC ......... 370/221, 401, 465, 299, 229, 230, 235, 370/259, 216; 709/226, 220; 711/108, 154; 714/100, 3, 1, 6
See application file for complete search history.

(56) References Cited

U.S. PATENT DOCUMENTS

| | | | |
|---|---|---|---|
| 7,334,046 B1 * | 2/2008 | Betker | 709/241 |
| 8,028,062 B1 * | 9/2011 | Wigmore et al. | 709/224 |
| 8,159,935 B1 * | 4/2012 | Fritz | 370/220 |
| 2005/0025058 A1 * | 2/2005 | Chaudhuri et al. | 370/238 |
| 2005/0036499 A1 * | 2/2005 | Dutt et al. | 370/401 |
| 2005/0198523 A1 * | 9/2005 | Shanbhag et al. | 713/200 |
| 2007/0174851 A1 * | 7/2007 | Smart | 719/324 |
| 2007/0266132 A1 | 11/2007 | Hariharan et al. | |
| 2009/0092141 A1 | 4/2009 | Banerjee | |
| 2009/0245242 A1 | 10/2009 | Carlson et al. | |
| 2010/0097941 A1 * | 4/2010 | Carlson et al. | 370/245 |

FOREIGN PATENT DOCUMENTS

EP     1 760 937 A2     3/2007

* cited by examiner

*Primary Examiner* — Andrew Chriss
*Assistant Examiner* — Jamal Javaid
(74) *Attorney, Agent, or Firm* — Cindy Kaplan

(57) ABSTRACT

In one embodiment, a method includes establishing a link between two N_Port Identifier Virtualization (NPIV) switches, the link having a high cost assigned thereto. The NPIV switches are in communication with a plurality of hosts through an N_Port Virtualization (NPV) device. The method further includes receiving at a first of the NPIV switches, an indication of a failure at a second of the NPIV switches, receiving data at the first NPIV switch, the data destined for one of the hosts associated with a domain of the second NPIV switch, and forwarding the data to the NPV device for delivery to the host, wherein a Fibre Channel Identifier (FCID) of the host is the same before and after the failure at the second NPIV switch. An apparatus is also disclosed.

18 Claims, 4 Drawing Sheets

N_PORT ID VIRTUALIZATION NODE REDUNDANCY

BACKGROUND

The present disclosure relates generally to communications networks, and more particularly, to Node Port (N_Port) ID Virtualization (NPIV).

Demands for increasing link speeds and computing speeds have driven a variety of specialized computer networking architectures. One such networking architecture, which is widely utilized in Storage Area Networks (SANs), is Fibre Channel (FC). Conventional Fibre Channel networks are deployed with a large number of FC switches connected to core devices. As the number of ports in the fabric increases, the number of switches also increases, which can result in a dramatic increase in the number of domains. Node Port Virtualization (NPV) addresses the increase in the number of domain IDs needed to deploy a large number of ports by making a fabric switch appear as a host to a core FC switch and as a FC switch to servers in the fabric.

The core FC switches allocate an FC address, referred to as a Fibre Channel Identifier (FCID), to each server and disk. NPIV allows for the assignment of multiple FCIDs to a single N_Port (end node port on the FC fabric). NPV makes use of NPIV to have multiple FCIDs allocated from the core switch on an N_Port Proxy (NP_Port) at the NPV device.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
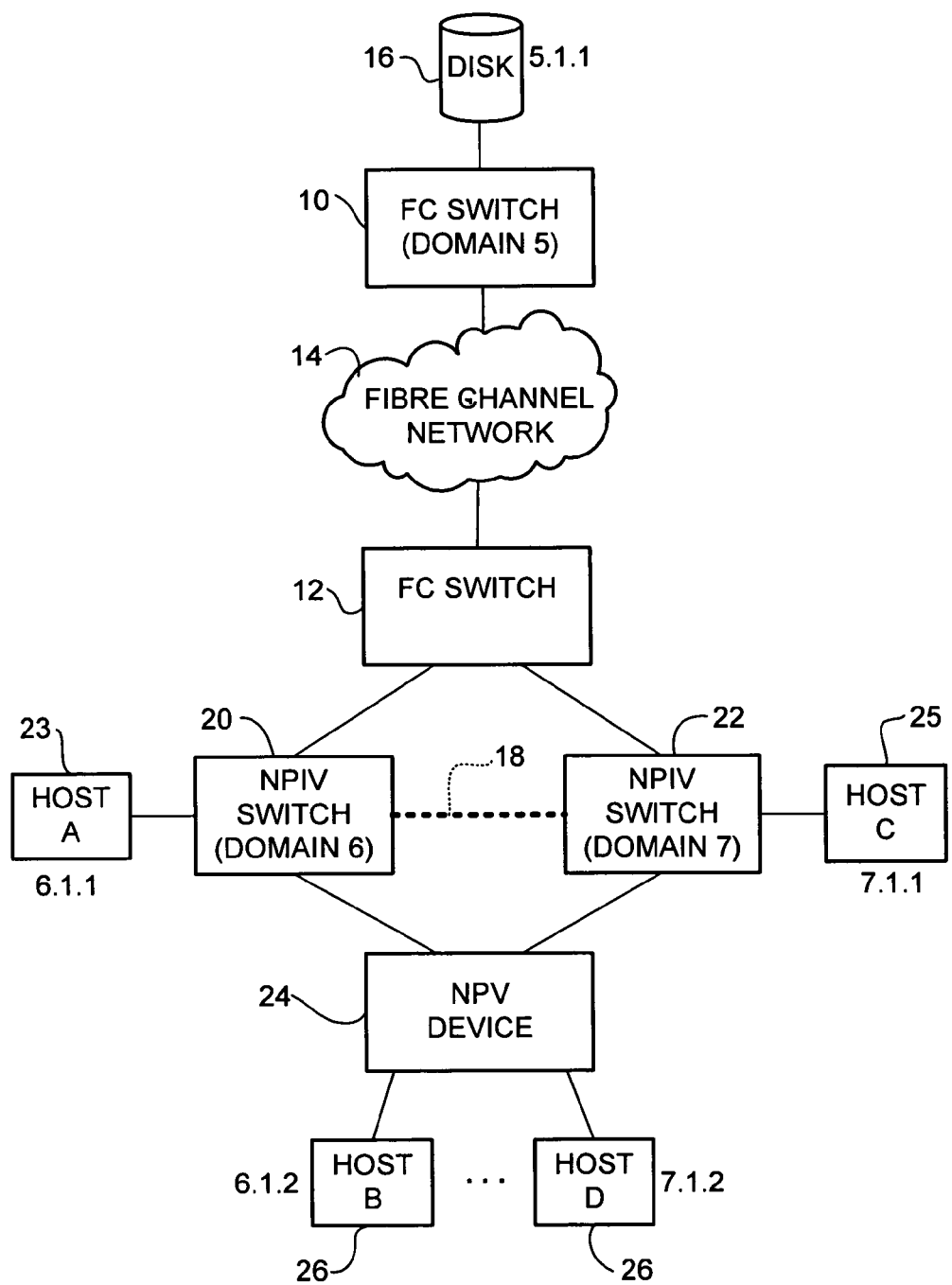
FIG. 1 illustrates an example of a network in which embodiments described herein may be implemented.

In one embodiment, a method generally comprises establishing a link between two N_Port Identifier Virtualization (NPIV) switches, the link having a high cost assigned thereto. The NPIV switches are in communication with a plurality of hosts through an N_Port Virtualization (NPV) device. The method further includes receiving at a first of the NPIV switches, an indication of a failure at a second of the NPIV switches, receiving data at the first NPIV switch, the data destined for one of the hosts associated with a domain of the second NPIV switch, and forwarding the data to the NPV device for delivery to the host, wherein a Fibre Channel Identifier (FCID) of the host is the same before and after the failure at the second NPIV switch.

In another embodiment, an apparatus generally comprises a port for communication with an N_Port Virtualization (NPV) device, an interface for communication with a link to an N_Port Identifier Virtualization (NPIV) switch, the link having a high cost assigned thereto, and a processor for receiving an indication of a failure at the NPIV switch, receiving data destined for a host associated with a domain of the NPIV switch, and forwarding the data to the NPV device for delivery to the host, wherein a Fibre Channel Identifier (FCID) of the host is the same before and after the failure at the NPIV switch.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications. Thus, the embodiments are to be accorded the widest scope consistent with the principles and features described herein. For purpose of clarity, details relating to technical material that is known in the technical fields related to the embodiments have not been described in detail.

The embodiments described herein operate in the context of a Fibre Channel (FC) network and may be implemented at an N_Port Identifier Virtualization (NPIV) enabled device (e.g., core switch) in communication with an N_Port Virtualization (NPV) device. In one embodiment, the NPV device is connected to two NPIV switches to provide node redundancy for hosts in communication with the FC fabric through the NPV device. The following provides a brief description of an FC network and associated terminology for NPV and NPIV, before referring to the example embodiments.

In a Fibre Channel network, FC ports of FC nodes are designated as N_Ports (Node Ports). The N_Port is an end node port on the Fibre Channel fabric. The port may be a Host Bus Adapter (HBA) in a server or a target port on a storage array, for example. FC ports of FC switches are designated as F_Ports (Fabric Ports connected to N_Ports) or E_Ports (Expansion Ports connecting two switches). The connection between two E_Ports forms an Inter-Switch Link (ISL). An NPV switch aggregates multiple locally connected N_Ports into one or more external NP_Ports (N_Port Proxy). The NP_Port connects to an F_Port and acts as a proxy for other N_Ports connected to the NPV switch.

Core FC switches allocate an FC address, referred to as a Fibre Channel Identifier (FCID), to each server and disk. FCID is a dynamic address assigned by the fabric when a device logs in. The FCID includes a domain, area, and port. It is to be understood that the term FCID as used herein may refer to any type of node identifier. The domain is a unique number assigned to each switch in a logical fabric. To determine this information, a port performs a login procedure. The login procedure includes Fabric Login (FLOGI) and N_Port Login (PLOGI). The FLOGI process allows a node to log in to the fabric and receive an assigned address from a switch.

NPIV is an FC protocol that provides a means to assign multiple FCIDs to a single N_Port and allows multiple applications on the N_Port to use different identifiers. The NPIV protocol uses an N_Port and a fabric (generally an FC switch) so that the N_Port can request and acquire multiple addresses from the fabric. NPV makes use of NPIV to have multiple FCIDs allocated from a core switch on the NP_Port.

It is often desirable to deploy an NPV switch dually connected to two different NPIV core switches. This allows the NPV switch to distribute fabric logins between two NPIV core switches. The deployment of redundant NPIV core switches also provides that when one of the NPIV core switches fails, there is a path via the other NPIV core switch to reach the hosts connected to the NPV switch. However, in conventional networks this requires that all of the hosts with FCIDs associated with the domain of the NPIV core switch that failed logout and immediately after re-login to the other NPIV core switch. The host thus has to re-perform the FLOGI and PLOGI processes with the targets. This additional logging off and logging in results in packet loss, significant down time, and possible application failures at the hosts. Also, it is possible that the operational NPIV core switch does not have sufficient FCIDs remaining in its domain to cover all of the devices that originally obtained an FCID from the peer NPIV core switch. If this is the case, some of the fabric logins will fail and the corresponding hosts will remain disconnected from the fabric. Another drawback with changing FCIDs following an NPIV core switch failure is that if the WWN (WorldWide Name) to FCID mapping changes, RSCN (Registered State Change Notification) messages need to be sent to the hosts and FCNS (Fibre Channel Network Switch) databases need to be updated.

The embodiments described herein provide NPIV core redundancy features without requiring devices attached to the NPV switch to change their FCID when an NPIV core switch fails. This prevents loss of data traffic, improves network stability and reliability, and avoids the problems discussed above.

Figure 4:
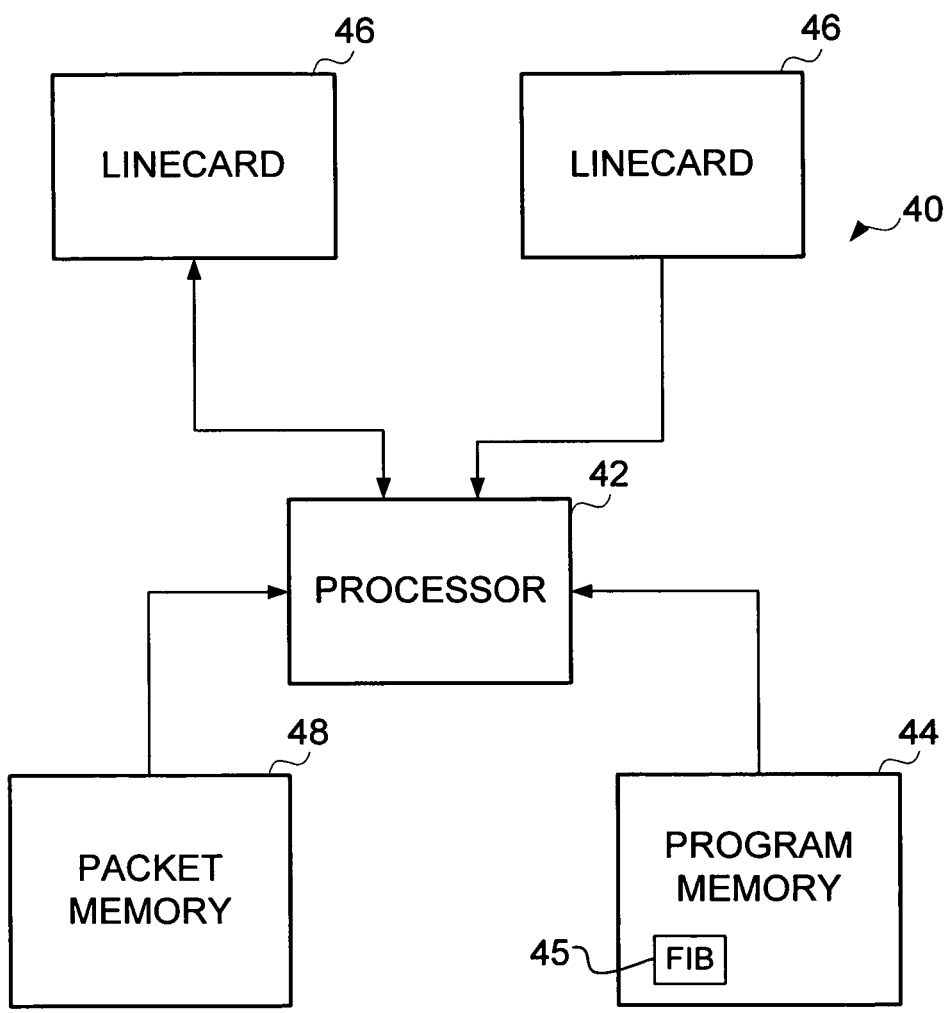
FIG. 4 is a block diagram illustrating an example of a network device useful in implementing embodiments described herein.

Referring now to the drawings, and first to FIG. 1, a network in which embodiments described herein may be implemented is shown. The embodiments operate in the context of a data communications network including multiple nodes. Some of the nodes in a network that employs the embodiments may be network devices such as switches, routers, gateways, or hosts. In one embodiment, the network device may be implemented as shown in the diagram of FIG. 4 and described below. It is to be understood that the network shown in FIG. 1 is only one example, and that the embodiments described herein may be implemented in networks having different topologies and network devices, without departing from the scope of the embodiments.

In the example shown in FIG. 1, switches 10, 12 are in communication with a Fibre Channel fabric 14. In one embodiment, the switches 10, 12 are Fibre Channel switches, such as those available from Cisco Systems Inc. of San Jose, Calif. Other types of switches may be used in various embodiments. The switches 10, 12 include numerous ports, also referred to as interfaces, which are used to connect various components to the switch. FC switch 10 is in communication with a disk 16, which is assigned an FCID from domain 5 (5.1.1). FC switch 12 is in communication with a plurality of host devices 23 (host A), 25 (host C), and 26 (host B, host D) via NPIV core switches 20, 22. The host devices may vary widely depending on context, use, and other characteristics of the network. Examples of host devices include servers, personal computers, printers, hand-held devices, storage devices, and the like.

In the network shown in FIG. 1, NPIV switch 20 is in communication with host A and NPIV switch 22 is in communication with host C. Host A and host C may be referred to as 'orphan nodes' since they each have a single communication path to only one device. Host A has an FCID of 6.1.1 corresponding to domain 6 of NPIV switch 20 and host C has an FCID of 7.1.1 corresponding to domain 7 of NPIV switch 22. NPV device 24 is dually connected to the redundant NPIV core switches 20, 22 and is in communication with a plurality of hosts (host B . . . host D) 26.

The NPIV switches 20, 22 include data stored in the form of tables and the like. The data may include for example, an FCID table, forwarding table (FIB (Forwarding Information Base)), etc. The NPIV switch 20, 22 also includes server interfaces to interface with physical or logical host-bus adapters (HBAs) of servers and interfaces to interface with FC switches.

In one embodiment, each of the NPIV core switches 20, 22 has a domain identifier (domain ID) that is unique to the switch within the network. As previously described, the domain ID is used in FCIDs assigned to hosts by the core switches. In the example shown in FIG. 1, NPIV switch 20 is assigned domain ID 6 and NPIV switch 22 is assigned domain ID 7. The hosts 26 attached to NPV switch 24 are associated with either domain 6 or 7. Host B is associated with domain 6 and has an FCID of 6.1.2 and host D is associated with domain 7 and has an FCID of 7.1.2. As described above, the FCIDs are assigned when the node 26 logs into the fabric. When both NPIV switches 20, 22 are operating and there are no failures of the links between the NPIV switches and the NPV switch 24 or the FC switch 12, traffic is forwarded between the disk 16 and the host B on NPIV switch 20 (domain 6). Traffic is forwarded between the disk 16 and the host D on NPIV switch 22 (domain 7). As described in detail below, the NPIV switch 20, 22 may also forward traffic associated with its peer NPIV switch's domain following a failure at the peer NPIV switch.

In one embodiment, the NPIV peer switches 20, 22 are configured with a link 18 connecting the two switches. The link 18 may be a virtual link or a physical link. The link 18 is assigned a high cost (e.g., near infinite routing cost) so that when Fabric Shortest Path First (FSPF) is run to calculate the best path between switches and establish routes across the fabric, the link 18 is not chosen as the best path. The high cost of the link 18 ensures that when both of the NPIV core switches 20, 22 are operating, there will not be any attempt to use the link to forward data. In normal operation, traffic between the hosts 26 and disk 16 flows through the appropriate NPIV core switch 20, 22 (i.e., core switch of the domain to which the host belongs). This is because the NPV switch 24 does not have a domain of its own and instead it borrows FCIDs from the domains of the NPIV core switches 20, 22 to which it is attached.

Figure 2:
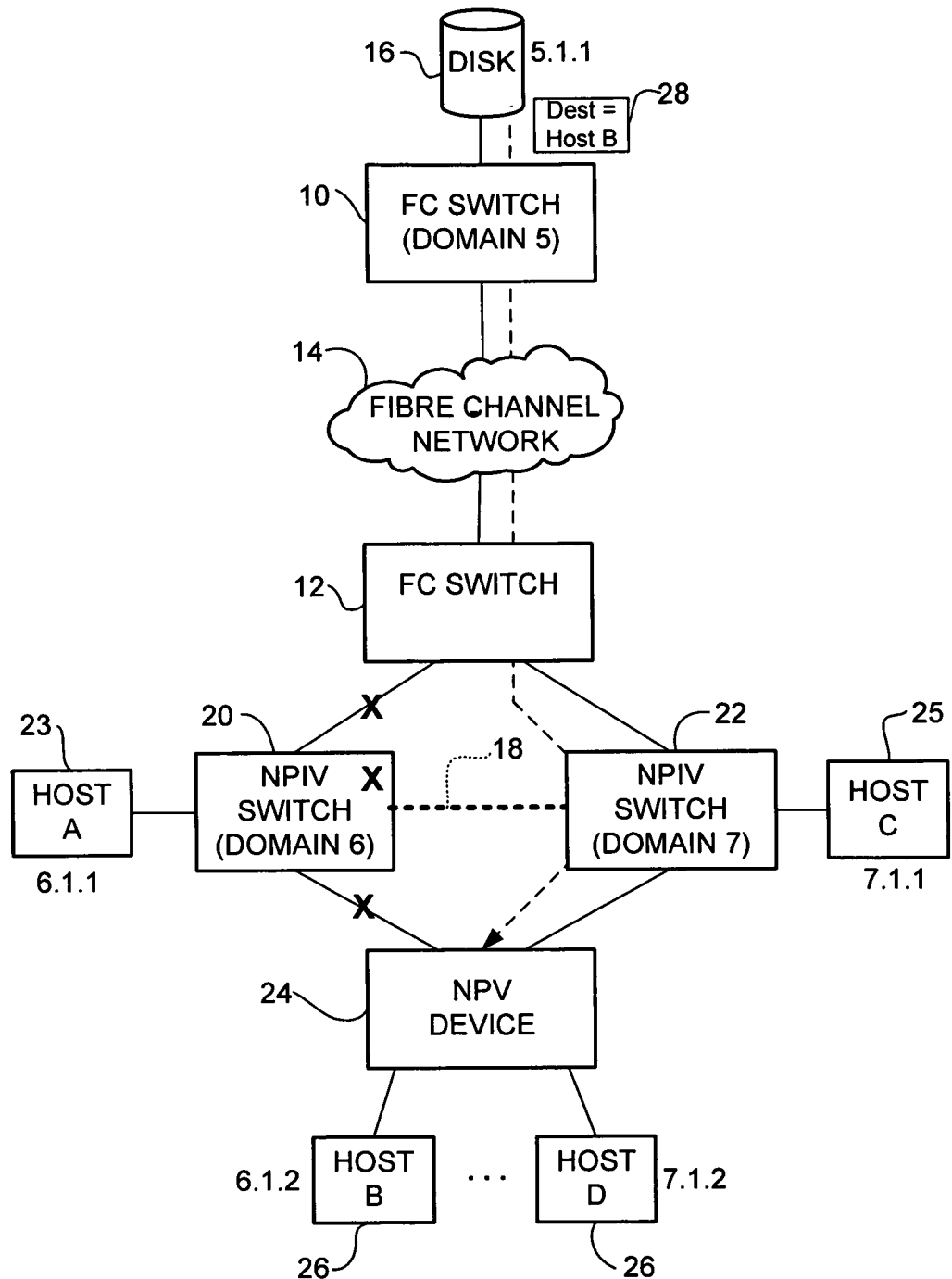
FIG. 2 illustrates traffic flow following a failure in the network of FIG. 1.

During normal operation, traffic between host B and disk 16 flows through NPIV switch 20 (domain 6) (FIG. 1). FIG. 2 illustrates a failure at the NPIV switch 20. The failure may be a problem with the NPIV core switch 20 or a link connecting the NPIV switch to the FC switch 12 or NPV device 24. When the NPIV switch 20 goes down, the failure is detected at NPIV switch 22. In one embodiment, the two core switches 20, 22 use a heartbeat mechanism to detect the liveliness of its peer switch. The heartbeat mechanism may use, for example, messages transmitted between the two switches 20, 22. In another embodiment, the NPIV switch 20, 22 identifies a failure at its peer switch (or associated links) based on information received from the FC switch 12 or another device within the network that has detected the failure. In response to the failure, NPIV switch 22 may modify its forwarding table to include traffic for the domain of its peer switch 20. Following the failure, data 28 transmitted from disk 16 to host B (and data transmitted from host B to disk 16) flows through NPIV switch 22, as shown in FIG. 2 and described below with respect to the flowchart of FIG. 3.

Figure 3:
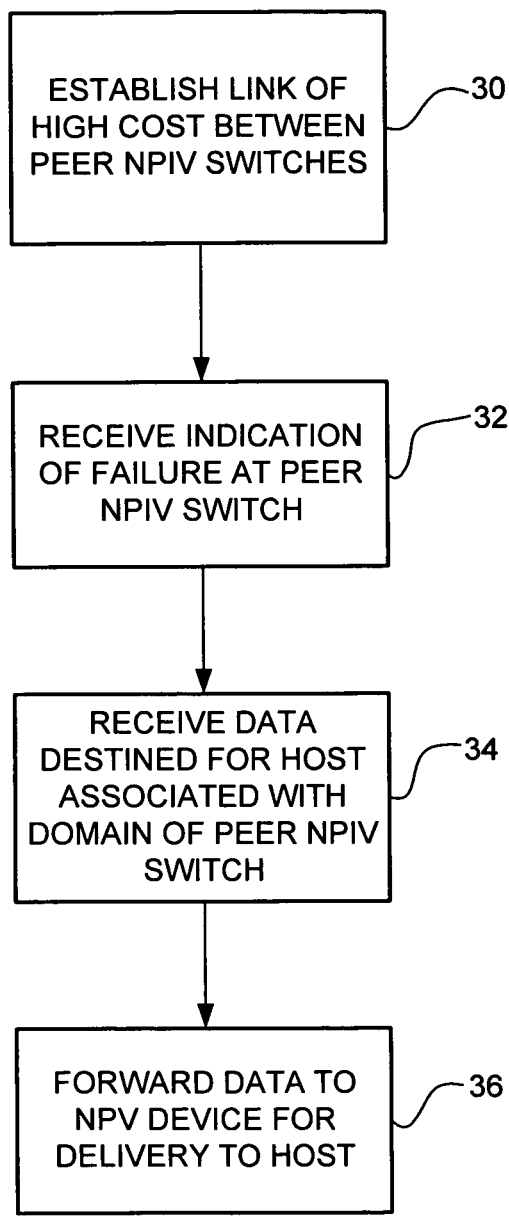
FIG. 3 is a flowchart illustrating an overview of a process for providing NPIV node redundancy in the network of FIG. 1, in accordance with one embodiment.

FIG. 3 is a flowchart illustrating an overview of a process for providing NPIV node redundancy, in accordance with one embodiment. As previously described, the NPIV switches 20, 22 are in communication with a plurality of hosts 26 through the NPV device 24. Each of the NPIV switches 20, 22 is associated with a different domain. At step 30, a link 18 is established between the redundant NPIV switches 20, 22. The link 18 may be a virtual link associated with a virtual interface at the NPIV switch, or the link may be defined on a physical communication path. As described above, the link 18 is assigned a high cost (e.g., high FSPF cost). At step 32, NPIV switch 22 (first switch) receives indication of a failure of its redundant peer NPIV switch 20 (second switch). The failure may be at the NPIV switch or a link. As described above, the failure may be identified through loss of transmission at a heartbeat mechanism or from information received from a neighbor node, for example. Since there is link 18 between the two NPIV switches, NPIV switch 22 continues to advertise that the NPIV switch 20 is reachable through the link 18 and FSPF computations conclude that the NPIV switch 20 is reachable through the NPIV switch 22. The NPIV switch 22 therefore receives data 28 destined for host B associated with the domain (domain 6) of the peer NPIV switch 20 (step 34). The NPIV switch 22 knows that host B is reachable through NPV device 24. The NPIV switch 22 may know this information based on state information previously provided by the NPIV switch 20 or NPV device 24, or based on FSPF calculations, for example. The operational NPIV switch 22 forwards the data 28 to the NPV device 24 for delivery to host B (step 36). Host B does not need to re-login to the fabric and therefore retains the same FCID assigned to the host before the failure at the NPIV switch 20.

The NPIV core switches 20, 22 may exchange information while they are both operational so that the information is readily available to the functioning core switch when the other core switch fails. Additional information may be retrieved by the functioning switch after it has received an indication that the other core switch has failed.

In one embodiment, zoning configurations are applied consistently and synchronized on both of the core NPIV switches 20, 22. FIB tables are quickly populated to point to links to the NPIV switches 20, 22 for FCIDs derived on the core switch that went down (e.g., NPIV switch 20 in FIG. 2). The zoning entries may be populated in advance in the peer NPIV core switches 20, 22 so that when the NPIV core switch fails, the zoning polices will be honored in the peer NPIV core switch. A protocol may be run between the NPV switch 24 and NPIV core switches 20, 22 to maintain state among the switches. In one embodiment, the NPV switch 24 keeps the NPIV core switches 20, 22 informed of name server related information and other state information for faster convergence.

Since the domain of the NPIV switch 20 is still operational after a failure at the NPIV switch, host A is not logged out of the fabric. However, since host A is an orphan node, it is no longer able to communicate with the FC fabric and should be logged out. In one embodiment, this is resolved by sending a Registered State Change Notification (RSCN) from the NPIV core switch that is still operating. In the example of FIG. 2, when core switch 20 goes down, host A is logged out of the fabric by NPIV core switch 22, which sends an RSCN message to FC switch 12.

FIG. 4 depicts a network device 40 that may be used to implement embodiments described herein. Network device 40 is configured to implement all of the network protocols and extensions thereof described herein. In one embodiment, network device 40 is a programmable machine that may be implemented in hardware, software, or any combination thereof. Logic may be encoded in one or more tangible media for execution by a processor. For example, processor 42 may execute codes stored in a program memory 44. Program memory 44 is one example of a computer-readable medium. Program memory 44 can be a volatile memory. Another form of computer-readable medium storing the same codes is a type of non-volatile storage such as floppy disks, CD-ROMs, DVD-ROMs, hard disks, flash memory, etc. The memory 44 may include a forwarding table (e.g., FIB 45), fabric login table, FCID table, etc.

Network device 40 interfaces with physical media via a plurality of linecards (network interfaces) 46. Linecards 46 may incorporate Ethernet interfaces, DSL interfaces, Gigabit Ethernet interfaces, 10-Gigabit Ethernet interfaces, SONET interfaces, etc. As packets are received, processed, and forwarded by network device 40, they may be stored in a packet memory 48. To implement functionality according to the system, linecards 46 may incorporate processing and memory resources similar to those discussed above in connection with the network device as a whole. It is to be understood that the network device 40 shown in FIG. 4 and described above is only one example and that different configurations of network devices may be used.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
    establishing a link between two N_Port Identifier Virtualization (NPIV) switches, the link having a high cost assigned thereto, each of the NPIV switches in communication with a plurality of hosts through an N_Port Virtualization (NPV) device operable to aggregate multiple locally connected N_Ports into an N_Port Proxy, and a Fibre Channel switch comprising an F_Port, the N Port Proxy acting as a proxy for N Ports connected to the NPV device;
    receiving at a first of the NPIV switches, an indication of a failure at a second of the NPIV switches and updating a forwarding table at the first NPIV switch;
    receiving data at the first NPIV switch, said data destined for one of the hosts associated with a domain of the second NPIV switch; and
    forwarding said data to the NPV device for delivery to the host, wherein a Fibre Channel Identifier (FCID) of the host is the same before and after said failure at the second NPIV switch;
    wherein said high cost of the link is set to prevent the link from being selected as a best path in a Fabric Shortest Path First calculation when the NPIV switches are both operating.

2. The method of claim 1 wherein the link comprises a virtual link.

3. The method of claim 1 wherein said cost of the link comprises a near infinite cost.

4. The method of claim 1 further comprising transmitting a registered state change notification from the first NPIV switch to log out an orphan host connected to the second NPIV switch following said failure.

5. The method of claim 1 further comprising synchronizing a zoning configuration between the first and second NPIV switches.

6. The method of claim 1 wherein receiving indication of said failure comprises receiving Fabric Shortest Path First information at the first NPIV switch.

7. The method of claim 1 wherein receiving indication of said failure comprises loss of a message from the second NPIV switch.

8. An apparatus comprising:
    a first port for communication with an N_Port Virtualization (NPV) device operable to aggregate multiple locally connected N_Ports into an N_Port Proxy, the N_Port Proxy acting as a proxy for N_Ports connected to the NPV device;

a second port for communication with a Fibre Channel switch comprising an F_Port;
an interface for communication with a link connected to an N_Port Identifier Virtualization (NPIV) switch, the link having a high cost assigned thereto to prevent the link from being selected as a best path in a Fabric Shortest Path First calculation when the NPIV switch is operating; and
a processor for receiving an indication of a failure at the NPIV switch, updating a forwarding table, receiving data destined for a host associated with a domain of the NPIV switch, and forwarding said data to the NPV device for delivery to the host, wherein a Fibre Channel Identifier (FCID) of the host is the same before and after said failure at the NPIV switch.

9. The apparatus of claim 8 wherein the link comprises a virtual link.

10. The apparatus of claim 8 wherein said cost of the link comprises a near infinite cost.

11. The apparatus of claim 8 wherein the processor is configured to transmit a registered state change notification to log out an orphan host connected to the NPIV switch following said failure.

12. The apparatus of claim 8 wherein the processor is configured to synchronize a zoning configuration with the NPIV switch.

13. The apparatus of claim 8 wherein the indication of said failure comprises Fabric Shortest Path First information.

14. The apparatus of claim 8 wherein the indication of said failure comprises loss of a message from the NPIV switch.

15. Logic encoded in one or more non-transitory tangible media for execution and when executed operable to:
establish a link between two N_Port Identifier Virtualization (NPIV) switches, the link having a high cost assigned thereto, each of the NPIV switches in communication with a plurality of hosts through an N_Port Virtualization (NPV) device operable to aggregate multiple locally connected N_Ports into an N_Port Proxy and a Fibre Channel switch comprising an F_Port, the N_Port Proxy acting as a proxy for N_Ports connected to the NPV device;
receive at a first of the NPIV switches, an indication of a failure at a second of the NPIV switches and update a forwarding table at the first NPIV switch;
receive data at the first NPIV switch, said data destined for one of the hosts associated with a domain of the second NPIV switch; and
forward said data to the NPV device for delivery to the host, wherein a Fibre Channel Identifier (FCID) of the host is the same before and after said failure at the second NPIV switch;
wherein said high cost of the link is set to prevent the link from being selected as a best path in a Fabric Shortest Path First Calculation when the NPIV switches are both operating.

16. The logic of claim 15 wherein the link comprises a virtual link.

17. The logic of claim 15 wherein said cost of the link comprises a near infinite cost.

18. The logic of claim 15 further operable to transmit a registered state change notification from the first NPIV switch to log out an orphan host connected to the second NPIV switch following said failure.

* * * * *